(12) United States Patent
Ahn et al.

(10) Patent No.: US 12,010,457 B2
(45) Date of Patent: *Jun. 11, 2024

(54) METHODS, SYSTEMS, AND COMPUTER PROGRAM PRODUCTS FOR PROVIDING VIDEO CALL SERVICE

(71) Applicant: Hyperconnect Inc., Seoul (KR)

(72) Inventors: Sang Il Ahn, Cheongju-si (KR); Byung Jong Kim, Seoul (KR); Eun Hee Choi, Seoul (KR)

(73) Assignee: Hyperconnect Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,302

(22) Filed: Oct. 29, 2021

(65) Prior Publication Data

US 2022/0337782 A1    Oct. 20, 2022

(30) Foreign Application Priority Data

Apr. 16, 2021 (KR) .......... 10-2021-0050122
Apr. 16, 2021 (KR) .......... 10-2021-0050137
Apr. 16, 2021 (KR) .......... 10-2021-0050138

(51) Int. Cl.
*H04N 7/14* (2006.01)
*G06F 3/04817* (2022.01)
(Continued)

(52) U.S. Cl.
CPC .............. *H04N 7/141* (2013.01); *G06F 3/14* (2013.01); *H04M 1/663* (2013.01);
(Continued)

(58) Field of Classification Search
CPC ............ H04N 1/42; H04N 7/14; H04N 7/141; H04N 2007/145; H04N 7/15; H04N 7/157;
(Continued)

(56) References Cited

U.S. PATENT DOCUMENTS 8,577,000 B1   11/2013  Brown
8,605,872 B2   12/2013  Mock
(Continued)

FOREIGN PATENT DOCUMENTS

EP    3481058 A1    5/2019
EP    3487169 A1    5/2019
(Continued)

OTHER PUBLICATIONS

Extended European Search Report for European Application No. 22151216.3, Search completed May 12, 2022, dated May 20, 2022, 7 Pgs.
(Continued)

*Primary Examiner* — Maria El-Zoobi
(74) *Attorney, Agent, or Firm* — KPPB LLP

(57) ABSTRACT

Provided is an operation method for a terminal performing a call. A first terminal may receive a first like signal transmitted from a second terminal to a server, and may transmit, to the server, a second like signal regarding a second user of the second terminal. At this time, the first terminal may receive a signal for establishing a call connection between the first terminal and the second terminal, and may perform a call with the second terminal based on the signal.

20 Claims, 10 Drawing Sheets

(51) Int. Cl.
*G06F 3/14* (2006.01)
*H04M 1/663* (2006.01)
*H04M 1/72433* (2021.01)
*H04M 1/72439* (2021.01)
*H04M 1/72448* (2021.01)
*H04M 1/72469* (2021.01)

(52) U.S. Cl.
CPC ... *H04M 1/72433* (2021.01); *H04M 1/72439* (2021.01); *H04M 1/72448* (2021.01); *H04M 1/72469* (2021.01); *H04N 7/147* (2013.01); *G06F 3/04817* (2013.01); *H04N 2007/145* (2013.01)

(58) Field of Classification Search
CPC . H04M 1/72519; H04M 3/56; H04M 2207/18
USPC ............... 348/14.02–14.9; 455/416; 709/204
See application file for complete search history.

(56) References Cited

U.S. PATENT DOCUMENTS

| | | | |
|---|---|---|---|
| 8,666,454 B2 | 3/2014 | Sim et al. | |
| 8,681,203 B1 | 3/2014 | Mn et al. | |
| 8,977,063 B2 | 3/2015 | Lee et al. | |
| 9,065,967 B2 | 6/2015 | Hubner et al. | |
| 9,578,282 B1 | 2/2017 | Sills et al. | |
| 10,523,900 B1 | 12/2019 | Jiang et al. | |
| 10,531,042 B2 | 1/2020 | Ahn et al. | |
| 10,567,450 B1 | 2/2020 | Gopal et al. | |
| 10,721,437 B2 | 7/2020 | Ahn et al. | |
| 10,728,499 B2 | 7/2020 | Ahn et al. | |
| 10,855,727 B2 | 12/2020 | Ahn et al. | |
| 11,032,512 B2 | 6/2021 | Ahn et al. | |
| 11,051,141 B2 | 6/2021 | Angapova et al. | |
| 11,196,777 B2 | 12/2021 | Ahn et al. | |
| 11,252,373 B2 | 2/2022 | Ahn et al. | |
| 11,606,533 B2 | 3/2023 | Ahn et al. | |
| 2002/0094806 A1 | 7/2002 | Kamimura | |
| 2003/0091239 A1 | 5/2003 | Imagawa et al. | |
| 2004/0249811 A1 | 12/2004 | Shostack et al. | |
| 2008/0192736 A1 | 8/2008 | Jabri et al. | |
| 2008/0242352 A1 | 10/2008 | Koshijima et al. | |
| 2008/0259154 A1 | 10/2008 | Garrison et al. | |
| 2008/0298571 A1 | 12/2008 | Kurtz et al. | |
| 2008/0300010 A1 | 12/2008 | Border et al. | |
| 2010/0145869 A1 | 6/2010 | Brown | |
| 2011/0249073 A1 | 10/2011 | Cranfill et al. | |
| 2011/0249086 A1 | 10/2011 | Guo et al. | |
| 2011/0276624 A1 | 11/2011 | Akhtar et al. | |
| 2012/0276504 A1 | 11/2012 | Chen et al. | |
| 2013/0003947 A1 | 1/2013 | Farah et al. | |
| 2014/0040368 A1* | 2/2014 | Janssens | H04L 67/306 709/204 |
| 2014/0118467 A1 | 5/2014 | Kim et al. | |
| 2014/0177813 A1 | 6/2014 | Leeds et al. | |
| 2014/0267583 A1 | 9/2014 | Zhu et al. | |
| 2014/0362163 A1 | 12/2014 | Winterstein et al. | |
| 2014/0368600 A1 | 12/2014 | Do et al. | |
| 2015/0109406 A1 | 4/2015 | Carlsson et al. | |
| 2015/0227902 A1 | 8/2015 | Bertanzetti et al. | |
| 2015/0229882 A1 | 8/2015 | Liu | |
| 2015/0244949 A1* | 8/2015 | Laroia | F21V 5/04 348/296 |
| 2015/0244979 A1* | 8/2015 | Andrada | H04L 65/1083 348/14.07 |
| 2015/0271444 A1 | 9/2015 | Defazio et al. | |
| 2015/0339627 A1 | 11/2015 | Brunner | |
| 2016/0019412 A1 | 1/2016 | Kang et al. | |
| 2016/0037129 A1 | 2/2016 | Tangeland et al. | |
| 2016/0352671 A1 | 12/2016 | Vaccari | |
| 2017/0064525 A1 | 3/2017 | Ben Arzi et al. | |
| 2018/0063278 A1* | 3/2018 | Helled | G06F 3/04817 |
| 2018/0160074 A1 | 6/2018 | Mercredi et al. | |
| 2018/0232562 A1 | 8/2018 | Cambor | |
| 2018/0270652 A1 | 9/2018 | Park | |
| 2018/0309801 A1* | 10/2018 | Rathod | H04M 3/5175 |
| 2018/0365904 A1 | 12/2018 | Holmes | |
| 2019/0037173 A1* | 1/2019 | Lee | G06F 3/04842 |
| 2019/0045335 A1 | 2/2019 | Jin et al. | |
| 2019/0075237 A1 | 3/2019 | Cheung | |
| 2019/0075340 A1 | 3/2019 | Hochart | |
| 2019/0158784 A1 | 5/2019 | Ahn et al. | |
| 2019/0182378 A1 | 6/2019 | Hou et al. | |
| 2019/0199962 A1 | 6/2019 | Ahn et al. | |
| 2019/0356715 A1 | 11/2019 | Rands | |
| 2020/0021685 A1 | 1/2020 | Borukhoff | |
| 2020/0099888 A1 | 3/2020 | Ahn et al. | |
| 2020/0203024 A1 | 6/2020 | Hunter et al. | |
| 2020/0314154 A1 | 10/2020 | Ahn et al. | |
| 2021/0037209 A1 | 2/2021 | Ahn et al. | |
| 2021/0051184 A1 | 2/2021 | Ahn et al. | |
| 2021/0099409 A1 | 4/2021 | Moon | |
| 2022/0337779 A1 | 10/2022 | Ahn et al. | |
| 2022/0337781 A1 | 10/2022 | Ahn et al. | |
| 2023/0070223 A1 | 3/2023 | Ahn et al. | |
| 2023/0095973 A1 | 3/2023 | Rad et al. | |

FOREIGN PATENT DOCUMENTS

| | | |
|---|---|---|
| EP | 3758387 A1 | 12/2020 |
| JP | H05328337 A | 12/1993 |
| JP | H1196229 A | 4/1999 |
| JP | 2003219383 A | 7/2003 |
| JP | 2004056488 A | 2/2004 |
| JP | 2005322969 A | 11/2005 |
| JP | 2008085421 A | 4/2008 |
| JP | 2013179601 A | 9/2013 |
| JP | 2017138948 A | 8/2017 |
| JP | 2019088004 A | 6/2019 |
| KR | 20090041634 A | 4/2009 |
| KR | 20090093528 A | 9/2009 |
| KR | 20110080347 A | 7/2011 |
| KR | 20130101823 A | 9/2013 |
| KR | 101564654 B1 | 10/2015 |
| KR | 101669521 B1 | 10/2016 |
| KR | 101673032 B1 | 10/2016 |
| KR | 20160133775 A | 11/2016 |
| KR | 20190056538 A | 5/2019 |

OTHER PUBLICATIONS

Extended European Search Report for European Application No. 20188232.1 Search completed Oct. 23, 2020, dated Nov. 2, 2020, 8 Pgs.
Extended European Search Report for European Patent Application No. 22167662.0, dated Sep. 16, 2022, 13 pages.
Japanese Office Action for Application No. 2020-121806, dated Nov. 22, 2021, 3 pages.
Office Action for Korean Application No. 10-2019-0091753, dated Jul. 7, 2020.
Baek, "Hyperconnect dating app 'Slide' launched in North America and Germany", ZD Net Korea, Published Nov. 17, 2020, Obtained from https://zdnet.co.kr/view/?no=20201117134248.
Extended European Search Report for European Patent Application No. 221676455, dated Sep. 16, 2022, 9 pages.
Extended Search Report for European Application No. 18213153.2, Search completed Apr. 29, 2019, dated May 7, 2019, 10 Pgs.
Japanese Office Action for JP Patent application No. 2018-238545, dated Nov. 1, 2019.
Korean Office Action for Application No. 10-2017-0181519, dated Apr. 18, 2019, 11 Pgs.

* cited by examiner

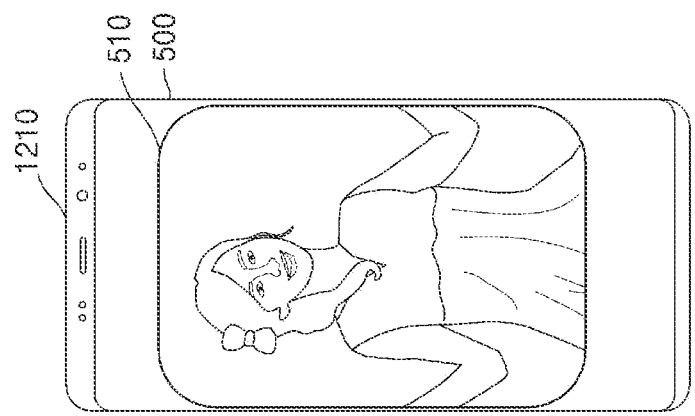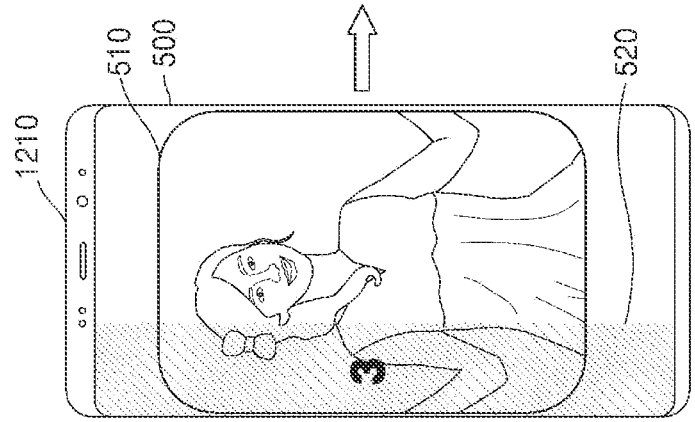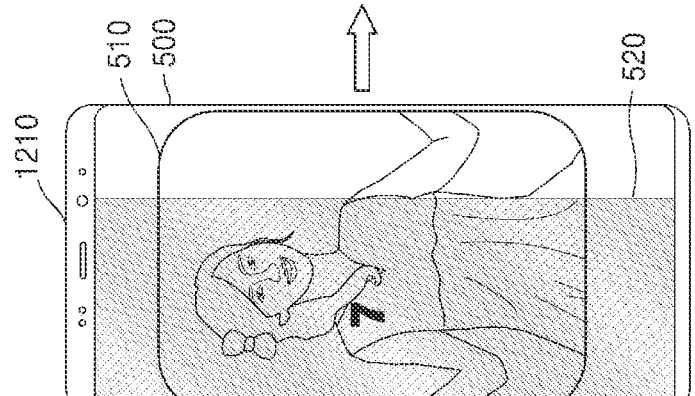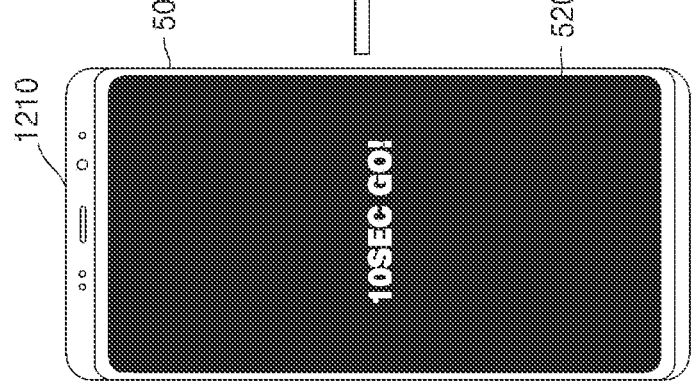

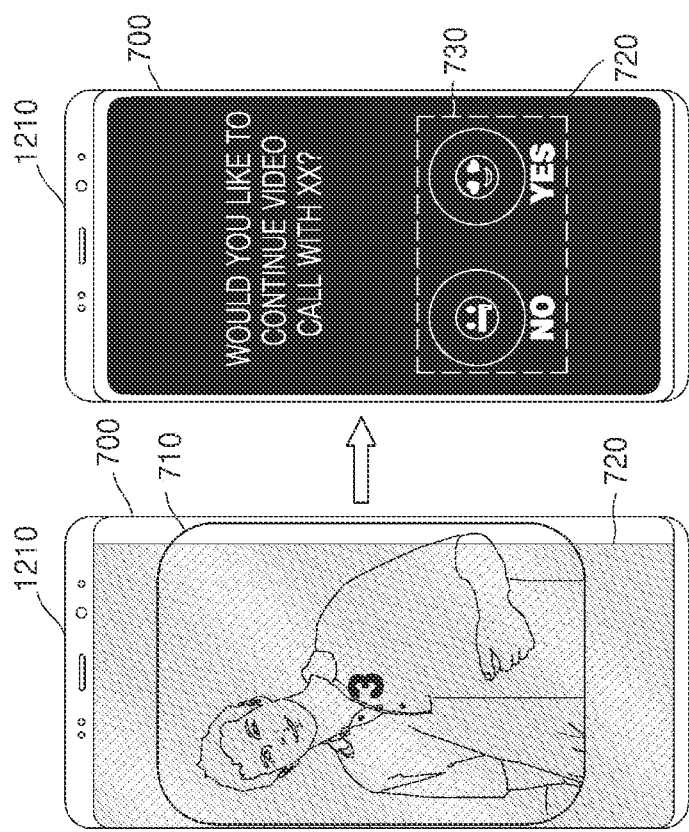
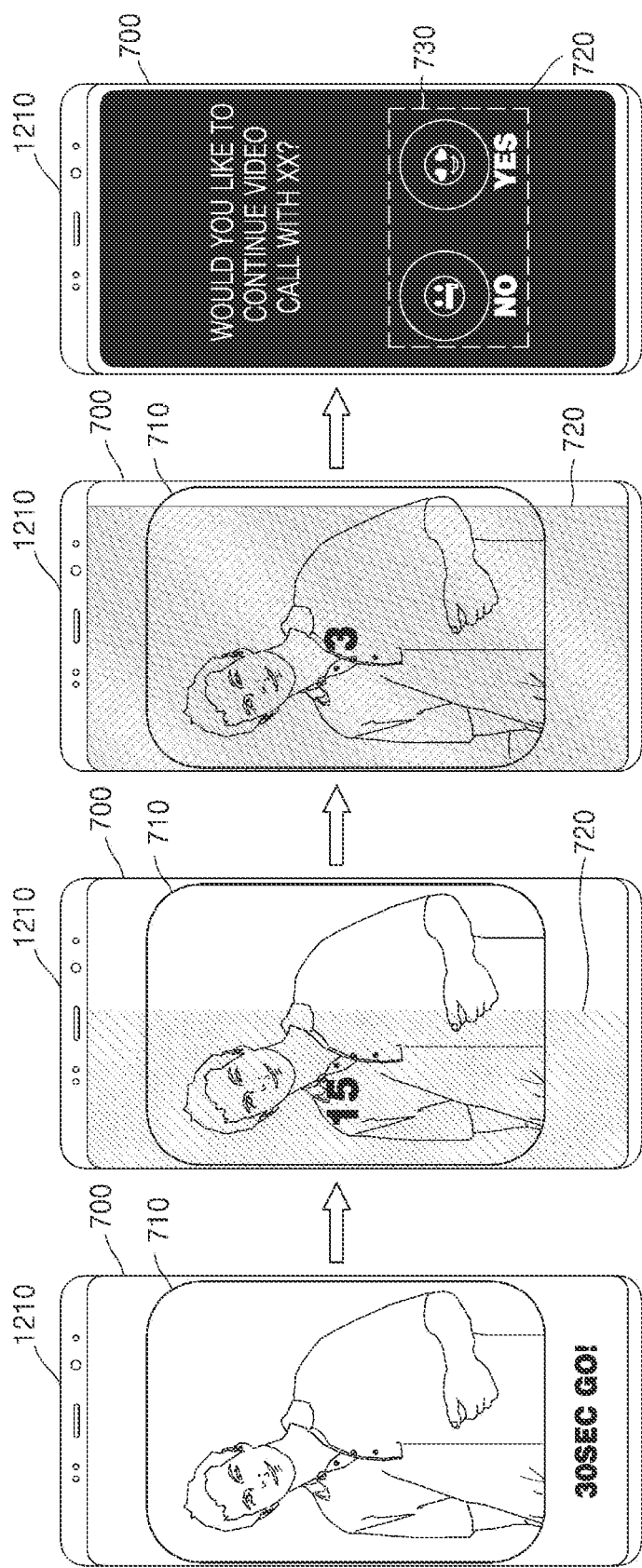

METHODS, SYSTEMS, AND COMPUTER PROGRAM PRODUCTS FOR PROVIDING VIDEO CALL SERVICE

CROSS-REFERENCE TO RELATED APPLICATION

This application claims priority under 35 U.S.C. § 119 to Korean Patent Application No. 10-2021-0050122 filed in the Korean Intellectual Property Office on Apr. 16, 2021, Korean Patent Application No. 10-2021-0050137 filed in the Korean Intellectual Property Office on Apr. 16, 2021, and Korean Patent Application No. 10-2021-0050138 filed in the Korean Intellectual Property Office on Apr. 16, 2021, the disclosures of which are incorporated by reference herein in their entireties.

BACKGROUND

1. Field

The present disclosure relates to a method, system, and computer program product for providing a video call service.

2. Description of the Related Art

With the development of wireless communication technology, it became possible to transmit massive amounts of data at a high speed, allowing not only voice call services, but also video call services to become increasingly common. The video call service refers to a call service for transmitting and receiving audio signals and video signals between a plurality of terminals.

Users may perform video calls by using portable terminals such as smartphones or smart tablets, and the users performing the video calls may or may not know each other.

Meanwhile, when a video call is performed between users who do not know each other, the users may feel psychological burdens when connecting to or leaving the video call, and thus a solution is required for the users to perform video calls more freely.

SUMMARY

Provided is a method, system and computer program product for providing a video call service.

Problems to be solved by the present disclosure are not limited to the problems mentioned above. Other unmentioned problems and advantages of the present disclosure may be understood by the following description, and will be more clearly understood by embodiments of the present disclosure. In addition, it should be appreciated that the problems and advantages to be solved by the present disclosure may be realized by means and combinations thereof indicated in the claims.

Additional aspects will be set forth in part in the description which follows and, in part, will either be made apparent from that description, or may be learned by practice of the presented embodiments of the disclosure.

According to one or more embodiments, an operation method of a first terminal includes: receiving a first like signal transmitted from a second terminal to a server; transmitting a second like signal regarding a second user of the second terminal to the server; receiving a signal for establishing a call connection between the first terminal and the second terminal from the server; and performing a call with the second terminal based on the signal.

In an embodiment, the second like signal may be transmitted after the first like signal is received, and the signal may be for automatically making a call from the first terminal to the second terminal.

In an embodiment, the performing of the call may be based on a response transmitted from the second terminal to the server, wherein the response corresponds to acceptance or rejection of the call automatically transmitted from the first terminal.

In an embodiment, the call may correspond to a preliminary call performed before a main call, and the preliminary call may correspond to a voice call and the main call may correspond to a video call.

In an embodiment, the first like signal may be based on profile information about a first user of the first terminal, and the second like signal may be based on profile information about the second user of the second terminal.

According to one or more embodiments, a computer program product including a computer-readable recording medium having recorded thereon a program for executing, on a computer: receiving a first like signal transmitted from a second terminal to a server; transmitting a second like signal regarding a second user of the second terminal to the server; receiving a signal for establishing a call connection between the first terminal and the second terminal from the server; and performing a call with the second terminal based on the signal.

According to one or more embodiments, a terminal including a first terminal includes: a communication unit configured to receive a first like signal transmitted from a second terminal to a server, transmit a second like signal regarding a second user of the second terminal to the server, and receive a signal for establishing a call connection between the first terminal and the second terminal; and a control unit configured to perform a call with the second terminal based on the signal.

BRIEF DESCRIPTION OF THE DRAWINGS

FIGS. 5A-5D illustrates examples of a graphical user interface displayed on a display of a terminal during a call waiting time;

FIGS. 7A-7D illustrates examples of a graphical user interface displayed on a display of a terminal while a preliminary call is in progress;

DETAILED DESCRIPTION

General terms, currently widely used have been selected as terms used in embodiments, considering the functions in the embodiments. However, the terms may vary according to the intention of one of ordinary skill in the art, precedent cases, or the appearance of new technologies. Also, some terms have been arbitrarily selected for specific cases, and in this case, the meaning of the selected terms will be described in detail in the detailed description of a corresponding embodiment. Thus, the terms used in the embodiments have to be defined based on the meanings of the terms together with the description throughout the specification, rather than on simple names of the terms.

In the description of embodiments, when a part is "connected" to another part, the part may not only be directly connected to the other part, but may also be electrically connected to the other part with another element in between. In addition, when a part "includes" a certain element, the part may further include another element instead of excluding the other element, unless otherwise stated.

The terms such as "include", "comprise", and the like used in the present embodiments should not be construed as necessarily including all of several components or operations described herein, but should be construed as not including some components or operations among them or as further including additional components or operations.

The description of the following embodiments should not be construed as limiting the scope of rights, and what can be easily inferred by one of ordinary skill in the art should be construed as belonging to the scope of the embodiments. Hereinafter, exemplary embodiments will be described in detail with reference to the accompanying drawings.

Figure 1:
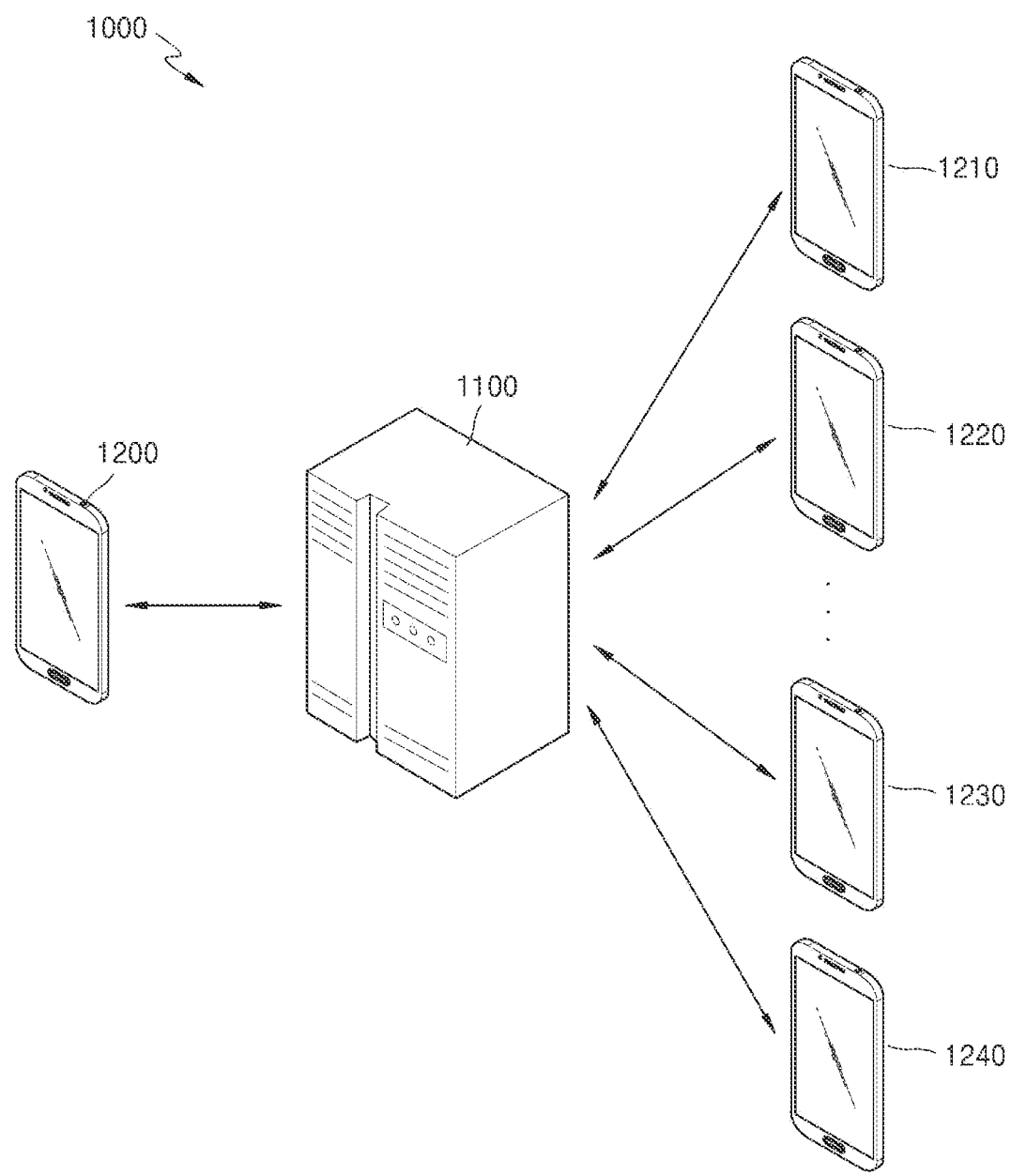
FIG. 1 is a diagram illustrating an example of a system including a server and at least one terminal.

FIG. 1 is a diagram illustrating an example of a system 1000 including a server 1100 and at least one terminal.

The system 1000 according to an embodiment may include the server 1100 and a plurality of user terminals, i.e., a first terminal 1200 and second terminals 1210 to 1240. The first terminal 1200 and the second terminals 1210 to 1240 are illustrated to number five in total for convenience, but are not limited thereto.

For example, the system 1000 may be a system that provides a video call service. The video call service refers to a service in which a plurality of users may communicate with each other by transmitting their images to other counterparts by using their respective terminals and receiving images of the counterparts. The users using the video call service may exchange images and/or voices through their respective terminals, and/or may transmit and receive text via a chatting function.

The user who intends to use the video call service may directly designate a counterpart to make a video call and use the video call service when the counterpart accepts the video call. Alternatively, the server 1100 providing the video call service may designate a counterpart randomly or according to a certain method, and the user may use the video call service with the designated counterpart.

The server 1100 and the first terminal 1200 and the second terminals 1210 to 1240 may perform communication by using a network. Examples of the network may include a local area network (LAN), a wide area network (WAN), a value-added network (VAN), a mobile radio communication network, a satellite communication network, and a combination thereof. The network may be a data communication network of various network entities shown in FIG. 1 to communicate smoothly with each other, and may include a wired Internet, a wireless Internet, and/or a mobile wireless communication network. Examples of wireless communication include wireless LAN (Wi-Fi), Bluetooth, Bluetooth low energy, Zigbee, Wi-Fi direct (WFD), ultra-wideband (UWB), infrared data association (IrDA), and near field communication (NFC), but are not limited thereto.

The first terminal 1200 and the second terminals 1210 to 1240 may include a smartphone, a tablet personal computer (PC), a PC, a smart television (TV), a mobile phone, a personal digital assistant (PDA), a laptop computer, a media player, a micro server, a global positioning system (GPS) device, an electronic book terminal, a digital broadcast terminal, a navigation device, a kiosk, an MP3 player, a digital camera, a home appliance, a camera-equipped device, and another mobile or non-mobile computing device, but are not limited thereto.

The server 1100 may be a relay device that connects the first terminal 1200 and the second terminals 1210 to 1240 with each other. The server 1100 may provide a relay service to transmit and receive data between the first terminal 1200 and the second terminals 1210 to 1240. The server 1100 may transmit data to the first terminal 1200 and the second terminals 1210 to 1240 or receive data from the first terminal 1200 and the second terminals 1210 to 1240, via the network.

The server 1100 may receive profile information from each of the first terminal 1200 and the second terminals 1210 to 1240. The profile information may include (but is not limited to) at least one of a picture of each user, an image of each user, hobby information, nickname information, key information, date of birth information, gender information, residential area information, and/or school information.

For example, a user of the first terminal 1200 may execute an application provided by the server 1100, and the first terminal 1200 may receive, from the server 1100, profile information about at least some of the users of the second terminals 1210 to 1240.

In other words, the user of the first terminal 1200 may be provided with profiles of some of the users of the second terminals 1210 to 1240. For example, the user of the first terminal 1200 may generate a list including likable users among the users of the second terminals 1210 to 1240, based on the provided profiles.

Figure 2:
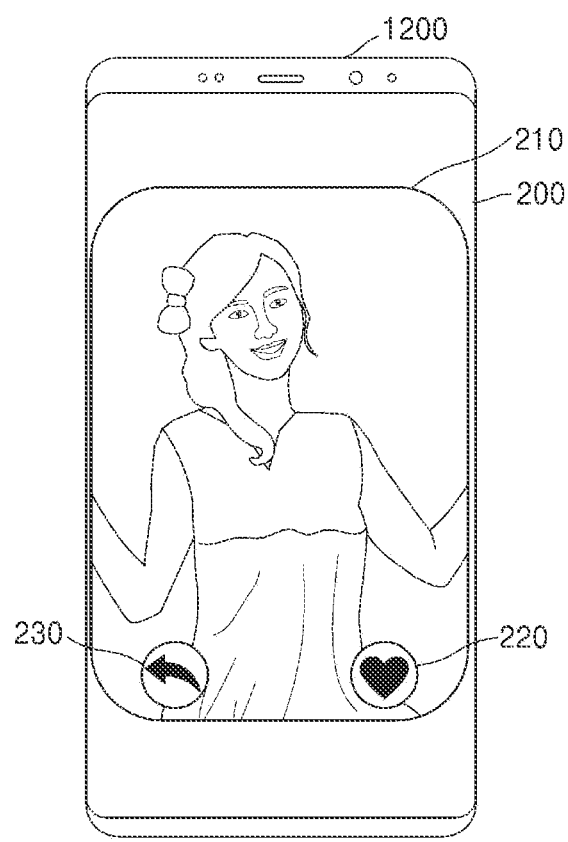
FIG. 2 is a diagram illustrating an example in which a terminal is provided with profile information.

FIG. 2 is a diagram illustrating an example in which a terminal is provided with profile information.

A first user of the first terminal 1200 may receive profile information about some of the users of the second terminals 1210 to 1240 from the server 1100. For example, FIG. 2 may illustrate an example in which profile information 210 of a second user of the second terminal 1210 among a plurality of pieces of profile information received from the server 1100 is displayed on a display 200 of the first terminal 1200. The profile information 210 may include an image or a video including a face of the second user of the second terminal 1210, but is not limited thereto.

For example, a like icon 220 and a dislike icon 230 may be displayed on the display 200 of the first terminal 1200. The first user of the first terminal 1200 may select one of the like icon 220 and the dislike icon 230, based on the profile information 210 of the second user displayed on the display 200. The first user of the first terminal 1200 may select the like icon 220 when they want to proceed with a video call with the second user, and select the dislike icon 230 when they do not want to proceed with the video call with the second user.

Meanwhile, the first terminal 1200 may transmit, to the server 1100, information indicating that the first user has inputted a like signal, based on the profile information 210 of the second user. In an embodiment, the second terminal 1210 may receive, from the first terminal 1200 or server 1100, information indicating that the first user of the first terminal 1200 has inputted a dislike signal.

As described above, the like signal may be transmitted to the server 1100 when the first user presses the like icon 220. However, embodiments are not limited thereto. For example, the like signal may be transmitted to the server 1100 even when the first user swipes or drags the like icon 220. Similarly, the dislike signal may be transmitted to the server 1100 when the first user presses the dislike icon 230, but is not limited thereto, and the dislike signal may be transmitted to the server 1100 even when the first user swipes or drags the dislike icon 230.

Figure 3:
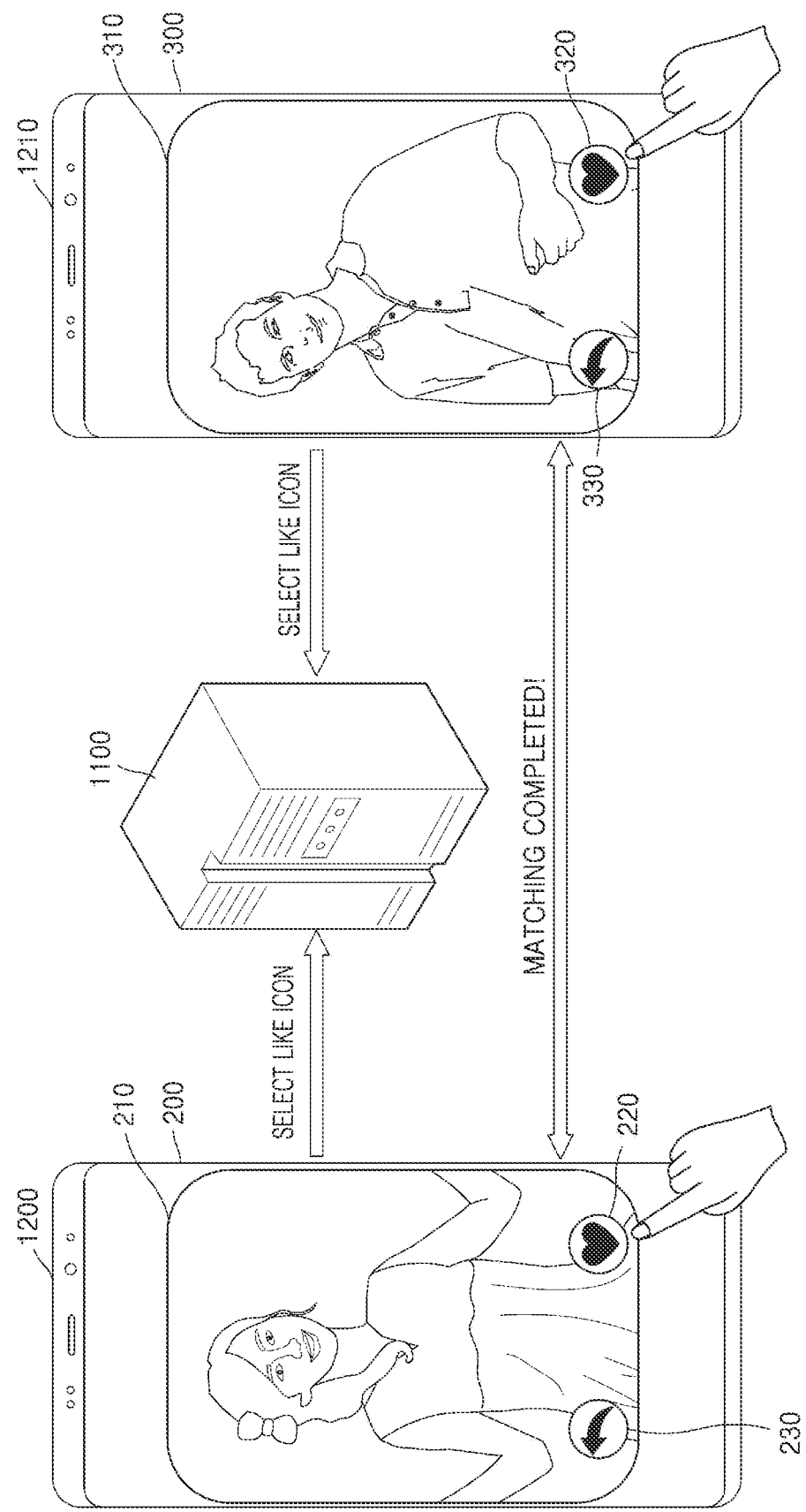
FIG. 3 is a diagram illustrating an example in which matching between terminals is completed.

FIG. 3 is a diagram illustrating an example in which matching between terminals is completed.

As described above with reference to FIG. 2, the server 1100 may receive the like signal transmitted from the first terminal 1200, based on the profile information about the second terminal 1210.

Similarly, profile information 310 of the first user of the first terminal 1200 may be displayed on a display 300 of the second terminal 1210. In addition, a like icon 320 and a dislike icon 330 may be displayed on the display 300 of the second terminal 1210. The second user of the second terminal 1210 may select the like icon 320 when they want to proceed with a video call with the first user, and select the dislike icon 330 when they do not want to proceed with the video call with the first user.

Also, the second terminal 1210 may transmit, to the server 1100, information indicating that the second user has inputted a like signal, based on the profile information 310 of the first user. As described above, the like signal may be transmitted to the server 1100 when the second user presses the like icon 320, but is not limited thereto. For example, the like signal may be transmitted to the server 1100 even when the second user swipes or drags the like icon 320.

Here, the server 1100 may determine that matching between the first user and the second user is completed, when the like signal transmitted by the first terminal 1200, based on the profile information 210 of the second user, and the like signal transmitted by the second terminal 1210, based on the profile information 310 of the first user, are both received. In other words, the server 1100 may determine that the matching between the first user and the second user is not completed, when information indicating that the first user has selected the dislike icon 230, based on the profile information 210 of the second user, or information indicating that the second user has selected the dislike icon 330, based on the profile information 310 of the first user, is received.

Figure 4:
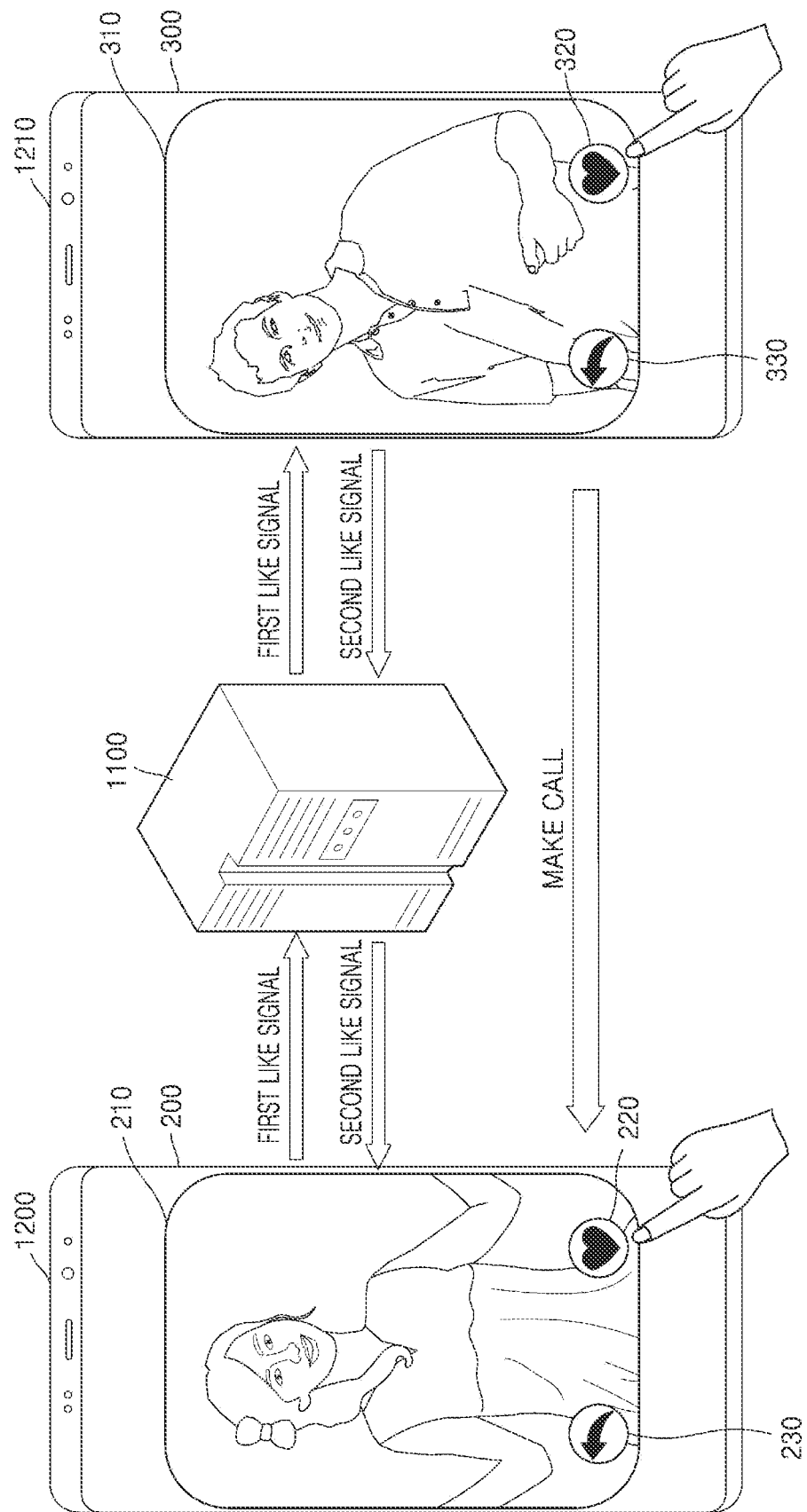
FIG. 4 is a diagram illustrating an example in which a call is made when matching between terminals is completed.

FIG. 4 is a diagram illustrating an example in which a call is made when matching between terminals is completed.

When the matching between the first user of the first terminal 1200 and the second user of the second terminal 1210 is completed, the server 1100 may provide a call service between the first terminal 1200 and the second terminal 1210.

For example, when the matching between the first user of the first terminal 1200 and the second user of the second terminal 1210 is completed, the first terminal 1200 or the second terminal 1210 may automatically make a call. In other words, the call may be automatically made even when the first user or the second user does not perform an input for making a call on the first terminal 1200 or the second terminal 1210.

The second terminal 1210 may receive a first like signal transmitted from the first terminal 1200 to the server 1100. Also, the second terminal 1210 may transmit, to the server 1100, a second like signal regarding the first user of the first terminal 1200. In this case, the server 1100 may determine that the matching between the first user of the first terminal 1200 and the second user of the second terminal 1210 is completed. Accordingly, the server 1100 may transmit a signal for establishing a call connection between the first terminal 1200 and the second terminal 1210, to the first terminal 1200 or the second terminal 1210.

Referring to FIG. 4, the second terminal 1210 may transmit a second like signal to the first terminal 1200 after receiving the first like signal. In other words, the server 1100 may receive the second like signal transmitted by the second terminal 1210 based on the profile information 310 of the first user, after receiving the first like signal transmitted by the first terminal 1200 based on the profile information 210 of the second user. In this case, the server 1100 may automatically make a call from the second terminal 1210 to the first terminal 1200. For example, a call may be made from the second terminal 1210 to the first terminal 1200 even when the second user of the second terminal 1210 does not perform a separate operation for making a call.

Meanwhile, the first terminal 1200 may determine whether to accept a call automatically made from the second terminal 1210. When the first terminal 1200 transmits, to the server 1100, a response accepting the call, the call between the first terminal 1200 and the second terminal 1210 may be performed. However, when the first terminal 1200 transmits, to the server 1100, a response rejecting the call or when the first terminal 1200 does not respond, the call between the first terminal 1200 and the second terminal 1210 may fail. However, since the first terminal 1200 may store a list including users regarding whom the first terminal 1200 has transmitted like signals to the server 1100, and the second user of the second terminal 1210 may be included in the list, the first terminal 1200 may make a call to the second terminal 1210 at any time. Similarly, since the first user of the first terminal 1200 is included in a list stored in the second terminal 1210, the second terminal 1210 may make a call to the first terminal 1200 at any time.

Meanwhile, even when the first user of the first terminal 1200 is not connected to an application provided by the server 1100, the first terminal 1200 may receive a call made from the second terminal 1210.

As such, a call can be made automatically when matching between the first and second users is completed, and thus a burden of the first and second users having to directly call a counterpart may be eliminated.

When the server 1100 makes a call from the second terminal 1210 to the first terminal 1200, a preliminary call may be performed between the first user and the second user after a call waiting time has elapsed. In other words, during and/or after the call waiting time has elapsed, the first user of the first terminal 1200 may determine whether to accept an incoming call, and when the first user of the first terminal 1200 accepts the incoming call, the preliminary call may be connected between the first user of the first terminal 1200 and the second user of the second terminal 1210.

The preliminary call may be performed before proceeding to a main call between the first user of the first terminal 1200 and the second user of the second terminal 1210. In other words, the preliminary call may be performed before the first user and the second user determine whether to proceed with the main call. For example, the preliminary call may correspond to a video call or a voice call relayed for a preset time.

The first user of the first terminal 1200 and the second user of the second terminal 1210 may determine whether to proceed with a main call after the preliminary call is terminated.

For example, the preliminary call may correspond to a voice call and the main call may correspond to a video call. In other words, since it is possible to determine whether to perform a video call through a voice call before performing the video call, i.e., the main call, the first and second users may feel less burdened in performing the video call. In addition, a conversion rate to the main call, i.e., the video call, may be increased when the preliminary call is a voice call rather than a video call. The present disclosure is not limited thereto, and the preliminary call may correspond to a video call, so the main call may also correspond to a video call.

FIGS. 5A-5D illustrates examples of a graphical user interface displayed on a display of a terminal during a call waiting time.

As described above with reference to FIG. 4, the server 1100 may automatically make a call from the second terminal 1210 to the first terminal 1200, when the like signal transmitted by the second terminal 1210, based on the profile information 310 of the first user, is received after the like signal transmitted by the first terminal 1200, based on the profile information 210 of the second user, is received.

When a call is made from the second terminal 1210 to the first terminal 1200, the call between the second user of the second terminal 1210 and the first user of the first terminal 1200 may be connected during and/or after the call waiting time has elapsed.

For example, the first user of the first terminal 1200 may determine whether to accept an incoming call during and/or after the call waiting time has elapsed. When the first user of the first terminal 1200 accepts the incoming call, the preliminary call may be connected between the first user of the first terminal 1200 and the second user of the second terminal 1210, and when the first user of the first terminal 1200 rejects the incoming call, the preliminary call between the first user of the first terminal 1200 and the second user of the second terminal 1210 may not be connected.

During the call waiting time, a camera of each of the first terminal 1200 and the second terminal 1210 may be activated. FIGS. 5A-5D illustrates examples of a graphical user interface displayed on a display 500 of the second terminal 1210 during the call waiting time.

Referring to FIGS. 5A-5D, the camera of the second terminal 1210 may be activated during the call waiting time, and an image of the second user captured by the camera may be displayed on the display 500 of the second terminal 1210. Although not shown in FIGS. 5A-5D, an image of the first user captured by the camera of the first terminal 1200 may also be displayed on a display of the first terminal 1200. Accordingly, the first and second users may check their faces before a call is connected.

Also, the call waiting time may be sequentially counted down, and a graphical user interface in which the call waiting time is sequentially counted down may be displayed on the display 500 of the second terminal 1210. Meanwhile, in FIGS. 5A-5D, the call waiting time is set to 10 seconds, but embodiments are not limited thereto. When the call waiting time is 10 seconds, the graphical user interface in which the call waiting time is sequentially counted down from 10 to 1 may be displayed on the display 500 of the second terminal 1210. For example, the graphical user interface counting down from 10 to 1 may be displayed on the display 500 of the second terminal 1210 in units of 1 second, but in FIGS. 5A-5D, a time point at which a countdown of the call waiting time starts, a time point at which 7 seconds remain, a time point at which 3 seconds remain, and a time point at which the countdown ends are briefly illustrated.

Also, as the call waiting time is sequentially counted down, visibility of an image area 510 of the second user displayed on the display 500 of the second terminal 1210 may change. As the call waiting time is sequentially counted down, a width and/or degree of opacity of an area 520 covering at least a part of the display 500 of the second terminal 1210 may change. In other words, as the area 520 covering at least a part of the display 500 of the second terminal 1210 changes, the visibility of the image area 510 of the second user displayed on the display 500 also may change.

For example, when the countdown of the call waiting time starts, the area 520 covering at least a part of the display 500 of the second terminal 1210 may cover all of the image area 510 of the second user. As the call waiting time is sequentially counted down, the area 520 covering at least a part of the display 500 of the second terminal 1210 may also gradually change. Accordingly, when the countdown of the call waiting time ends, the area 520 covering at least a part of the display 500 of the second terminal 1210 disappears, and the image area 510 of the second user may be completely revealed. The revelation of the image area 510 of the second user may provide various benefits, such as (but not limited to) allowing for symmetry with the preliminary call, highlighting the countdown to help the user prepare, etc. In a number of embodiments, the image area 510 of the second terminal 1210 may not be covered during the call waiting time.

For example, as the call waiting time is sequentially counted down, the width of the area 520 covering at least a part of the display 500 of the second terminal 1210 may gradually decrease, and the degree of opacity of the area 520 covering at least a part of the display 500 of the second terminal 1210 may gradually decrease.

Referring to FIG. 5A, the width of the area 520 covering at least a part of the display 500 of the second terminal 1210 when the countdown of the call waiting time starts may be the same as a width of the display 500 of the second terminal 1210, and the opacity of the area 520 covering at least a part of the display 500 of the second terminal 1210 may have a preset value enough to cover the image area 510 of the second user.

Referring to FIG. 5B, the width of the area 520 covering at least a part of the display 500 of the second terminal 1210 when 7 seconds remain for the call waiting time may be set to be a value obtained by multiplying 0.7 by the width of the display 500 of the second terminal 1210, and the opacity of the area 520 covering at least a part of the display 500 of the second terminal 1210 may be set to be a value obtained by multiplying 0.7 by the preset value enough to cover the image area 510 of the second user.

Also, referring to FIG. 5C, the width of the area 520 covering at least a part of the display 500 of the second terminal 1210 when 3 seconds remain for the call waiting time may be set to be a value obtained by multiplying 0.3 by the width of the display 500 of the second terminal 1210, and the opacity of the area 520 covering at least a part of the display 500 of the second terminal 1210 may be set to be a value obtained by multiplying 0.3 by the preset value enough to cover the image area 510 of the second user.

Referring to FIG. 5D, when the call waiting time ends, the area 520 covering at least a part of the display 500 of the second terminal 1210 disappears, and the image area 510 of the second user may be completely revealed.

As described above, the width of the area 520 covering at least a part of the display 500 of the second terminal 1210 may be determined as a value obtained by multiplying the width of the display 500 of the second terminal 1210 by a certain ratio. For example, the certain ratio may be set to be a value obtained by dividing a remaining call waiting time by the call waiting time as the countdown proceeds, but is not limited thereto. Similarly, the opacity of the area 520 covering at least a part of the display 500 of the second terminal 1210 may be determined as a value obtained by multiplying preset opacity by a certain ratio. Here, the preset opacity may be set to be a value enough to completely cover the image area 510 of the second user, and the certain ratio may be set as the countdown proceeds to be a value obtained by dividing the remaining call waiting time by the initial call waiting time, but are not limited thereto.

Meanwhile, the image of the first user may also be displayed on the display of the first terminal 1200 during the call waiting time, and a change in an area covering at least a part of the graphical user interface of the first terminal 1200 as the call waiting time is sequentially counted may be the same as described above.

Figure 6:
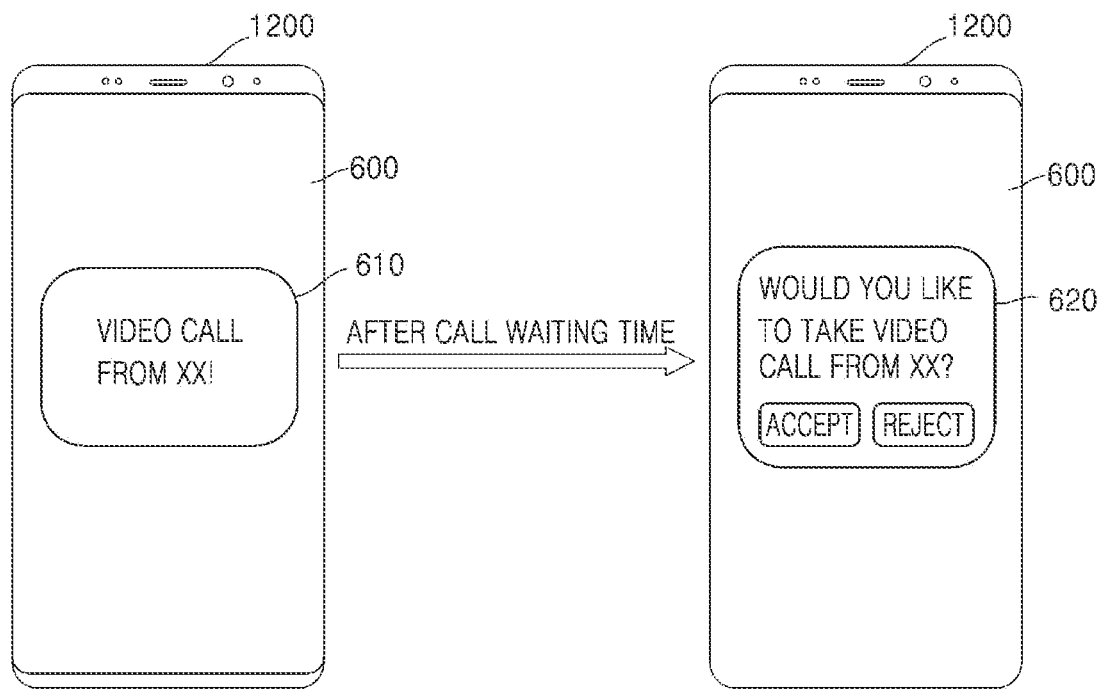
FIG. 6 illustrates another example of a graphical user interface displayed on a display of a terminal during a call waiting time.

FIG. 6 illustrates another example of a graphical user interface displayed on a display of a terminal during a call waiting time.

FIG. 6 illustrates an example of a graphical user interface displayed on a display 600 of the first terminal 1200 when a call is made from the second terminal 1210 to the first terminal 1200.

First, when the call is made from the second terminal 1210 to the first terminal 1200, the display 600 of the first terminal 1200 may display a message window 610 indicating that the call is made from the second user of the second terminal 1210.

After the message window 610 indicating that the call is made from the second user of the second terminal 1210 is displayed, the camera of the first terminal 1200 may be activated. The display 600 of the first terminal 1200 may display an image of the first user captured by the camera, and at the same time, a graphical user interface in which the call waiting time is sequentially counted down may be displayed. The graphical user interface in which the call waiting time is sequentially counted down may be the same as described above with reference to FIG. 4.

A message window 620 inquiring whether to accept the call with the second user of the second terminal 1210 may be displayed on the display 600 of the first terminal 1200, during and/or after the call waiting time ends.

When the first user of the first terminal 1200 selects a button accepting an incoming call, a preliminary call between the first user of the first terminal 1200 and the second user of the second terminal 1210 may be connected. When the first user of the first terminal 1200 selects a button rejecting the incoming call, the preliminary call between the first user of the first terminal 1200 and the second user of the second terminal 1210 may not be connected.

For example, when the first user of the first terminal 1200 selects the button accepting the incoming call, the server 1100 may relay the preliminary call between the first terminal 1200 and the second terminal 1210 for a preset time.

After the preset time during which the preliminary call is relayed has elapsed, the server 1100 may receive a response as to whether to perform a main call from the first user of the first terminal 1200 and the second user of the second terminal 1210, to determine whether to proceed with the main call.

Meanwhile, a first graphical user interface displayed on a display of each of the first terminal 1200 and the second terminal 1210 while the preliminary call is in progress may be different from a second graphical user interface displayed on the display of each of the first terminal 1200 and the second terminal 1210 while the main call is in progress. The first graphical user interface displayed on the display of each of the first terminal 1200 and the second terminal 1210 while the preliminary call is in progress will be described with reference to FIG. 7 below.

FIGS. 7A-7D illustrates examples of a graphical user interface displayed on a display of a terminal while a preliminary call is in progress.

While the preliminary call is in progress, the display of each of the first terminal 1200 and the second terminal 1210 may display an image area of a user of a counterpart terminal performing the preliminary call and a blocking area covering at least a part of the image area. For example, the blocking area may change as a preset time during which the preliminary call is relayed elapses, and visibility of the image area of the user of the counterpart terminal may change based on the blocking area.

For example, the camera of each of the first terminal 1200 and the second terminal 1210 may be activated during the preset time during which the preliminary call progresses. An image of the second user captured by the camera of the second terminal 1210 may be displayed on the display of the first terminal 1200, and an image of the first user captured by the camera of the first terminal 1200 may be displayed on the display of the second terminal 1210. FIGS. 7A-7D illustrates examples of a graphical user interface displayed on a display 700 of the second terminal 1210 for a preset time.

Referring to FIGS. 7A-7D, the preset time may be sequentially counted down, and a graphical user interface in which the preset time is sequentially counted down may be displayed on the display 700 of the second terminal 1210. Meanwhile, in FIGS. 7A-7D, the preset time is set to 30 seconds, but is not limited thereto. When the preset time is 30 seconds, the graphical user interface in which the preset time is sequentially counted down, from 30 to 1, may be displayed on the display 700 of the second terminal 1210. For example, the graphical user interface counting down from 30 to 1 may be displayed on the display 700 of the second terminal 1210 in units of 1 second, but in FIGS. 7A-7D, a time point at which a countdown of the preset time starts, a time point at which 15 seconds remain, a time point at which 3 seconds remain, and a time point at which the countdown ends are briefly illustrated.

Also, as the preset time is sequentially counted down, visibility of an image area 710 of the first user displayed on the display 700 of the second terminal 1210 may change. As the preset time is sequentially counted down, a width and/or opacity of a blocking area 720 covering at least a part of the display 700 of the second terminal 1210 may change. In other words, as the blocking area 720 covering at least a part of the display 700 of the second terminal 1210 changes, the visibility of the image area 710 of the first user displayed on the display 700 may change.

For example, the image area 710 of the first user may be completely revealed when the countdown of the preset time starts. As the preset time is sequentially counted down, the blocking area 720 covering at least a part of the display 700 of the second terminal 1210 may also gradually change.

Accordingly, when the countdown of the preset time ends, the blocking area 720 covering at least a part of the display 700 of the second terminal 1210 may completely cover the image area 710 of the first user.

For example, as the preset time is sequentially counted down, the width of the blocking area 720 covering at least a part of the display 700 of the second terminal 1210 may gradually increase. Alternatively, the degree of opacity of the blocking area 720 covering at least a part of the display 700 of the second terminal 1210 may gradually increase.

Referring to FIG. 7A, the image area 710 of the first user may be completely revealed when the countdown of the preset time starts.

Referring to FIG. 7B, the width of the blocking area 720 covering at least a part of the display 700 of the second terminal 1210 when 15 seconds remain for the preset time may be set to be a value obtained by multiplying 0.5 by the width of the display 700 of the second terminal 1210, and the opacity of the blocking area 720 covering at least a part of the display 700 of the second terminal 1210 may be set to be a value obtained by multiplying 0.5 by a preset value enough to cover the image area 710 of the first user.

Also, referring to FIG. 7C, the width of the blocking area 720 covering at least a part of the display 700 of the second terminal 1210 when 3 seconds remain for the preset time may be set to be a value obtained by multiplying 0.9 by the width of the display 700 of the second terminal 1210, and the opacity of the blocking area 720 covering at least a part of the display 700 of the second terminal 1210 may be set to be a value obtained by multiplying 0.9 by the preset value enough to cover the image area 710 of the first user.

Also, referring to FIG. 7D, the width of the blocking area 720 covering at least a part of the display 700 of the second terminal 1210 when the preset time ends may be set to be the same as the width of the display 700 of the second terminal 1210, and the opacity of the blocking area 720 covering at least a part of the display 700 of the second terminal 1210 may be set to be the same as the preset value enough to cover the image area 710 of the first user.

As described above, the width of the blocking area 720 covering at least a part of the display 700 of the second terminal 1210 may be determined as a value obtained by multiplying the width of the display 700 of the second terminal 1210 by a certain ratio. For example, the certain ratio may be set to be a value obtained by dividing a time elapsed as the countdown starts by the preset time, but is not limited thereto. Similarly, the opacity of the blocking area 720 covering at least a part of the display 700 of the second terminal 1210 may be determined as a value obtained by multiplying preset opacity by a certain ratio. Here, the preset opacity may be set to be a value enough to completely cover the image area 710 of the first user, and the certain ratio may be set to be a value obtained by dividing the time elapsed as the countdown starts by the preset time, but are not limited thereto.

An image of the second user of the second terminal 1210 may also be displayed on a display of the first terminal 1200 for the preset time, and a change in an area covering at least a part of the display of the first terminal 1200 as the preset time is sequentially counted may be the same as described above.

As described above, because a face of a counterpart is gradually hidden on a graphical user interface of a terminal as a preset time is sequentially counted down, a burden of a user when determining whether to proceed with a main call after a preliminary call ends may be relieved.

Meanwhile, referring to FIG. 7D, after the preset time has elapsed, the display 700 of the second terminal 1210 may display a message window 730 requesting a response as to whether to proceed with the main call with the first user. Also, after the preset time has elapsed, a message window requesting a response as to whether to proceed with the main call with the second user may also be displayed on a display of the first terminal 1200. The responses of the first user and the second user may be transmitted to the server 1100, and the server 1100 may or may not proceed with the main call, based on the responses.

For example, the server 1100 may proceed with the main call when a response accepting the option to proceed with the main call is received from each of the first terminal 1200 and the second terminal 1210. Also, the server 1100 may not proceed with the main call when the response rejecting to proceed with the main call is received from the first terminal 1200 or the second terminal 1210.

Figure 8:
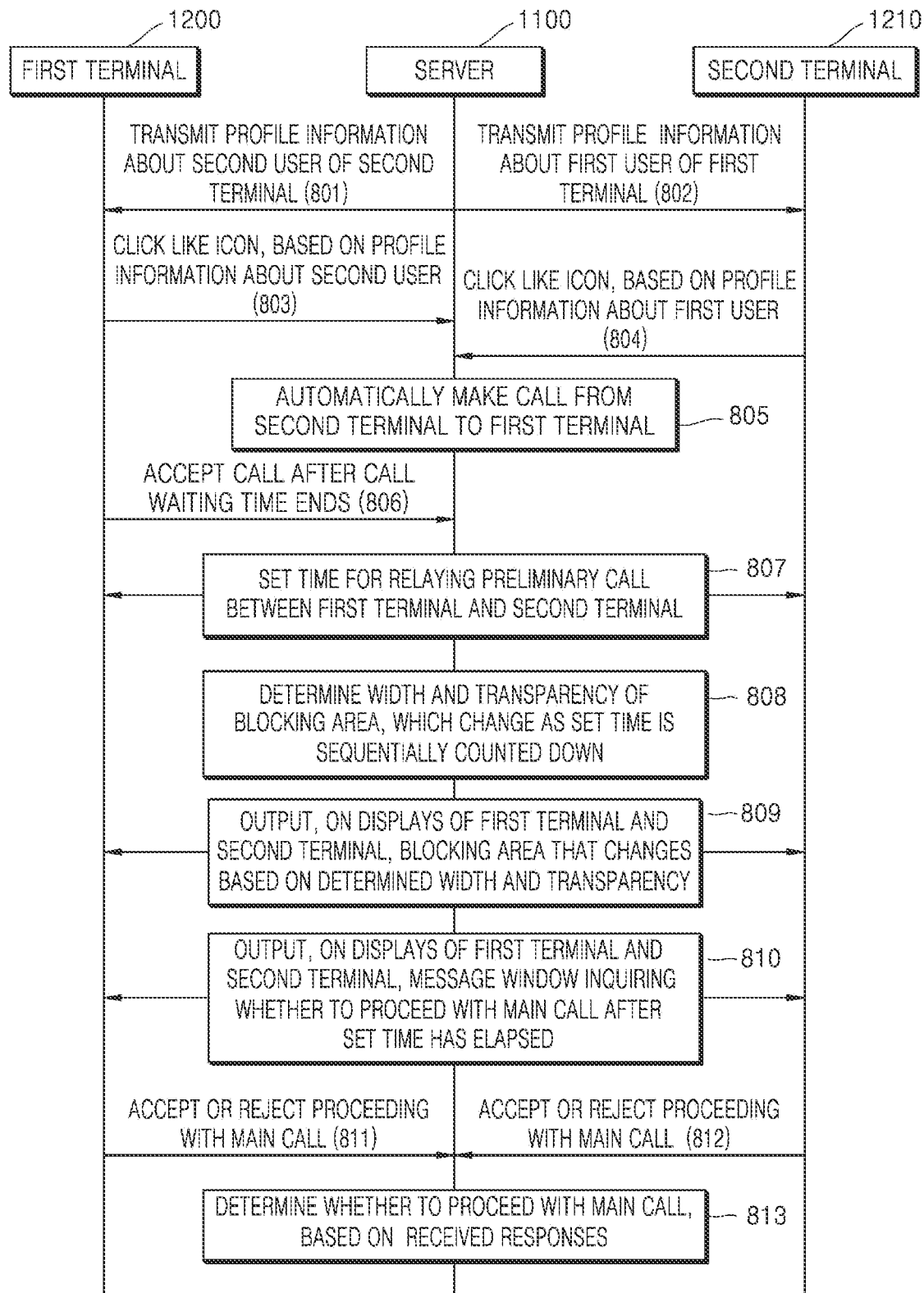
FIG. 8 is a diagram illustrating processes in which a video call is made in a system including a first terminal, a server, and a second terminal, according to an embodiment.

FIG. 8 is a diagram illustrating processes in which a video call is made in a system including a first terminal, a server, and a second terminal, according to an embodiment.

Referring to FIG. 8, in operation 801, the server 1100 may transmit profile information about the second user of the second terminal 1210 to the first terminal 1200. Also, in operation 802, the server 1100 may transmit profile information about the first user of the first terminal 1200 to the second terminal 1210.

In operation 803, the first user of the first terminal 1200 may click on a like icon, based on the profile information about the second user. When the first user of the first terminal 1200 clicks the like icon, the server 1100 may receive information, from the first terminal 1200, indicating that the first user has selected the like icon based on the profile information about the second user.

Also, in operation 804, the second user of the second terminal 1210 may click on a like icon, based on the profile information about the first user. When the second user of the second terminal 1210 clicks the like icon, the server 1100 may receive information, from the second terminal 1210, indicating that the second user has selected the like icon based on the profile information about the first user. The server 1100 may determine that matching between the first user and the second user is completed, when both the information indicating that the first user has selected the like icon based on the profile information about the second user and the information indicating that the second user has selected the like icon based on the profile information about the first user are received.

In operation 805, the server 1100 may automatically make a call from the second terminal 1210 to the first terminal 1200. In other words, the server 1100 may automatically make a call to the first terminal 1200 even when the second user does not perform an input for performing a call.

When the call is automatically made from the second terminal 1210 to the first terminal 1200, a message window informing the first user that the call is made from the second user of the second terminal 1210 may be displayed on a display of the first terminal 1200. When the call is automatically made from the second terminal 1210 to the first terminal 1200, a preliminary call may be connected between the second user and the first user after a call waiting time has elapsed. The call waiting time may be sequentially counted down, and a graphical user interface in which the call waiting time is sequentially counted down may be displayed on displays of the first terminal 1200 and second terminal 1210.

In operation 806, the first terminal 1200 may accept the call during and/or after the call waiting time ends. For example, a message window inquiring whether to accept the call with the second user of the second terminal 1210 may be displayed on the display of the first terminal 1200, during and/or after the call waiting time ends.

In operation 807, the server 1100 may set a time for relaying the preliminary call between the first terminal 1200 and the second terminal 1210. For example, the server 1100 may relay the preliminary call only for the set time, and determine whether to proceed with a main call after the set time has elapsed.

In operation 808, the server 1100 may set a blocking area that changes as the set time is sequentially counted down. For example, the server 1100 may set a width and opacity of the blocking area, which change as the set time is sequentially counted down. The blocking area may correspond to an area covering at least a part of the display of each of the first terminal and the second terminal. The width of the blocking area may increase as the set time is sequentially counted down, and the opacity of the blocking area may increase as the set time is sequentially counted down. For example, the width of the blocking area may be determined as a value obtained by multiplying a width of the display by a certain ratio. The certain ratio may be determined as a value obtained by dividing a time during which a countdown has already been performed by a total time during which a countdown is meant to be performed, but is not limited thereto. Similarly, the opacity of the blocking area may be determined as a value obtained by multiplying preset opacity by a certain ratio. The certain ratio may be determined as a value obtained by dividing a time during which a countdown has already been performed by a total time during which a countdown is meant to be performed, but is not limited thereto.

In operation 809, the server 1100 may output the blocking area to the displays of the first terminal 1200 and the second terminal 1210. For example, the server 1100 may output the blocking area that changes based on the set width and opacity, on the displays of the first terminal 1200 and the second terminal 1210. As the blocking area that changes based on the determined width and opacity is output to the displays of the first terminal 1200 and the second terminal 1210, visibility of an image area of the second user displayed on the display of the first terminal 1200 may change, and visibility of an image area of the first user displayed on the display of the second terminal 1210 may change.

In operation 810, the server 1100 may output a message window inquiring whether to proceed with a main call on the displays of the first terminal 1200 and the second terminal 1210 after the set time has elapsed.

In operation 811, the first terminal 1200 may transmit, to the server 1100, a response accepting or rejecting the option to proceed with the main call. Also, in operation 812, the second terminal 1210 may transmit, to the server 1100, a response accepting or rejecting the option to proceed with the main call.

In operation 813, the server 1100 may determine whether to proceed with the main call, based on the received responses. For example, the server 1100 may extend the main call when the response accepting the option to proceed with the main call is received from each of the first terminal 1200 and the second terminal 1210. Also, the server 1100 may not proceed with the main call when the response rejecting the option to proceed with the main call is received from the first terminal 1200 or the second terminal 1210.

Figure 9:
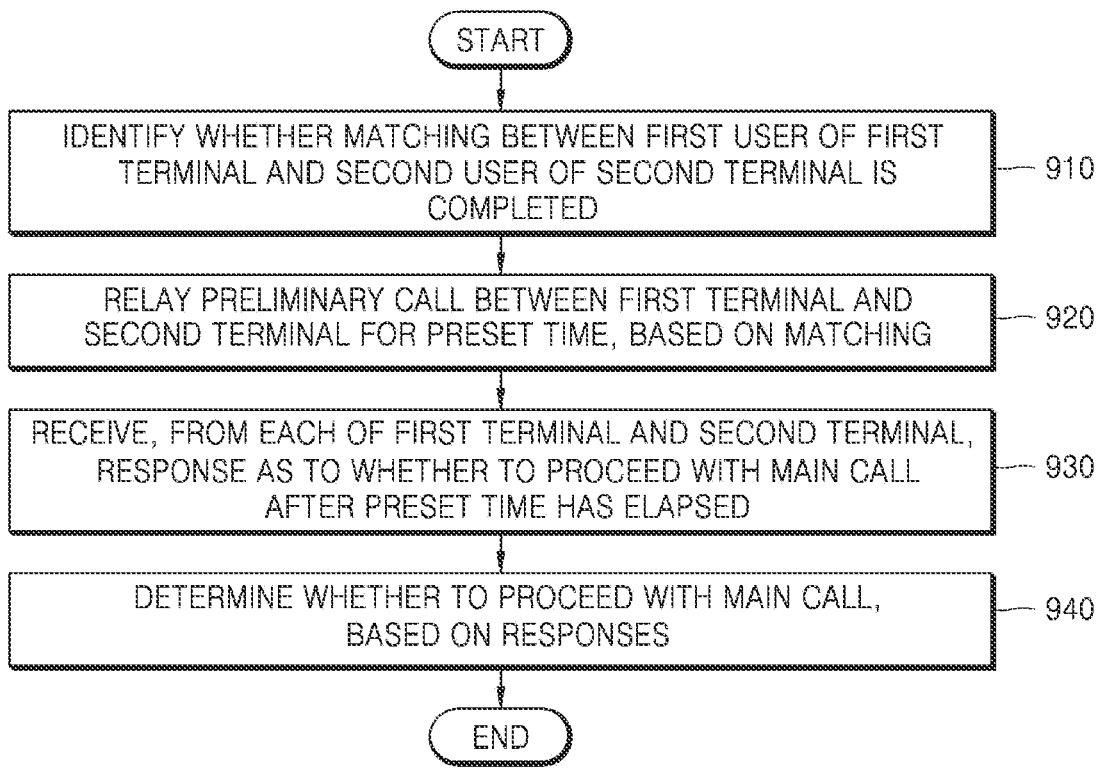
FIG. 9 is a flowchart of a method of relaying a video call, according to an embodiment.

FIG. 9 is a flowchart of a method of performing a call, according to an embodiment.

Referring to FIG. 9, in operation 910, a first terminal may receive a first like signal transmitted from a second terminal to a server. The first like signal may correspond to the like signal transmitted by the second terminal to the server based on the profile information of a first user of the first terminal. The second terminal may transmit information to the server indicating that a second user has input the like signal based on the profile information of the first user. For example, a first like signal may be transmitted to the server when the second user presses the like icon, but embodiments are not limited thereto. For example, the first like signal may be transmitted to the server even when the second user swipes or drags the like icon.

In operation 920, the first terminal may transmit, to the server, a second like signal regarding the second user of the second terminal. The second like signal may correspond to the like signal transmitted by the first terminal to the server based on the profile information of the second user of the second terminal. The first terminal may transmit, to the server, information indicating that the first user has input the like signal based on the profile information of the second user. For example, a second like signal may be transmitted to the server when the first user presses the like icon, but embodiments are not limited thereto. For example, the second like signal may be transmitted to the server even when the first user swipes or drags the like icon.

In operation 930, the first terminal may receive, from the server, a signal for establishing a call connection between the first terminal and the second terminal. For example, the second like signal may be transmitted after the first like signal is received, and a signal may be for automatically making a call from the first terminal to the second terminal. In other words, the server may receive the second like signal transmitted by the first terminal based on the profile information about the second user, after receiving the first like signal transmitted by the second terminal based on the profile information about the first user. In this case, the server may automatically make a call from the first terminal to the second terminal. For example, even when the first user of the first terminal does not perform a separate operation to make a call, a call may be transmitted from the first terminal to the second terminal.

In operation 940, the first terminal may perform a call with the second terminal based on the signal. For example, the call may correspond to a preliminary call performed before the main call. The preliminary call may be performed before a main call is proceeded between the first user of the first terminal and the second user of the second terminal. In other words, the preliminary call may be performed before the first user and the second user determine whether to proceed with the main video call. For example, the preliminary call may correspond to a video call or a voice call relayed for a preset time. In an embodiment, the preliminary call may correspond to a voice call and the main call may correspond to a video call.

When the call is made from the first terminal to the second terminal, a call may be connected between the second user of the second terminal and the first user of the first terminal after a call waiting time has elapsed. For example, after the call waiting time has elapsed, the second user of the second terminal may transmit a response to the server corresponding to the acceptance or rejection of the outgoing call. When the second user of the second terminal accepts the outgoing call, a preliminary call between the first user of the first terminal and the second user of the second terminal may be connected, and when the second user of the second terminal rejects the outgoing call, the preliminary call between the first user and the second user of the second terminal may not be connected.

Figure 10:
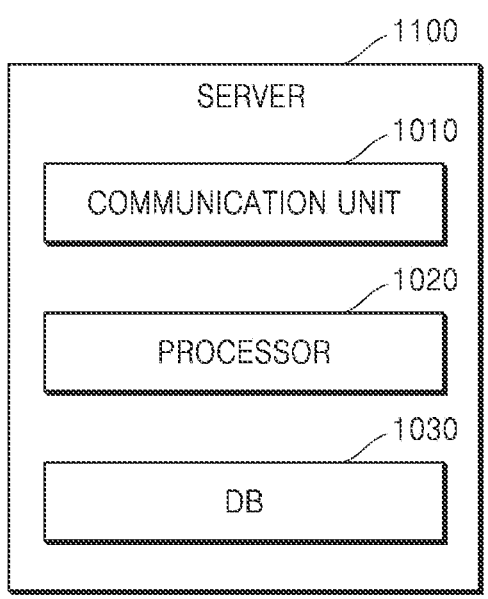
FIG. 10 illustrates an example of a block diagram of the server.

FIG. 10 illustrates an example of a block diagram of the server 1100.

Referring to FIG. 10, the server 1100 may include a communication unit 1010, a processor 1020, and a database (DB) 1030. The server 1100 of FIG. 10 may be the same as the server 1100 of FIG. 1. Only components related to an embodiment are shown for the server 1100 of FIG. 10. Accordingly, it would be understood by one of ordinary skill in the art that general-purpose components other than those shown in FIG. 10 may be further included.

The communication unit 1010 may include one or more components enabling wired/wireless communication with a terminal. For example, the communication unit 1010 may include a short-range wireless communication unit (not shown), a mobile communication unit (not shown), and a broadcast receiver (not shown).

The DB 1030 is hardware storing various types of data processed in the server 1100, and may store a program for processes and controls by the processor 1020.

The DB 1030 may include random access memory (RAM) such as dynamic random-access memory (DRAM) or static random-access memory (SRAM), read-only memory (ROM), electrically erasable programmable read-only memory (EEPROM), CD-ROM, Blu-ray or another optical disk storage, a hard disk drive (HDD), a solid-state drive (SSD), or a flash memory.

The processor 1020 controls overall operations of the server 1100. For example, the processor 1020 may generally control an input unit (not shown), a display (not shown), the communication unit 1010, and the DB 1030, by executing programs stored in the DB 1030. The processor 1020 may control operation of the server 1100 by executing programs stored in the DB 1030.

The processor 1020 may be implemented by using at least one of an application specific integrated circuit (ASIC), a digital signal processor (DSP), a digital signal processing device (DSPD), a programmable logic device (PLD), a field programmable gate array (FPGA), a controller, a microcontroller, a microprocessor, or another electrical unit for performing functions.

The server 1100 may communicate with at least one user terminal through the communication unit 1010.

The communication unit 1010 may receive, from at least one terminal, information indicating that a like icon or a dislike icon is selected based on profile information about a user of another terminal. The processor 1020 may determine that matching between a first user and a second user is completed, when the communication unit 1010 receives both information indicating that the first user has selected a like icon based on profile information of the second user and information indicating that the second user has selected a like icon based on profile information of the first user.

The processor 1020 may relay a preliminary call between a first terminal and a second terminal for a preset time, based on the matching. The processor 1020 may set a time for relaying the preliminary call, and may perform a countdown for the set time. The processor 1020 may determine a width of a blocking area, which changes as a preset time is sequentially counted down, and may determine the opacity of the blocking area, which changes as the preset time is sequentially counted down. The processor 1020 may output the blocking area on a graphical user interface of each of the first terminal and the second terminal, based on the determined width and opacity.

The communication unit 1010 may receive, from each of the first terminal and the second terminal, a response as to whether to proceed with a main call after the preset time has elapsed.

The processor 1020 may determine whether to proceed with the main call even after the preset time has elapsed, based on the received responses. The processor 1020 may proceed with the main call when a response accepting the option to proceed with the main call is received from each of the first terminal and the second terminal. Also, the processor 1020 may not proceed with the main call when a response rejecting to proceed with the main call is received from the first terminal or the second terminal.

According to the embodiments of the present disclosure, a call is made automatically when matching between the first and second users is completed, and thus a burden of the first and second users having to directly call a counterpart may be eliminated.

Various embodiments of the present disclosure may be implemented as software (for example, a program) including one or more instructions stored in a machine-readable storage medium. For example, a processor of the machine may invoke and execute at least one of the one or more instructions stored from the storage medium. Accordingly, the machine is enabled to operate to perform at least one function according to the one or more invoked instructions. The one or more instructions may include code generated by a compiler or code executable by an interpreter. The machine-readable storage medium may be provided in the form of a non-transitory storage medium. Here, "non-transitory" only means that the storage medium is a tangible device and does not contain a signal (for example, electromagnetic waves). This term does not distinguish a case where data is stored in the storage medium semi-permanently and a case where the data is stored in the storage medium temporarily.

According to an embodiment, a method according to various embodiments of the present disclosure may be provided by being included in a computer program product. The computer program product is a product that can be traded between sellers and buyers. The computer program product may be distributed in a form of machine-readable storage medium (for example, a compact disc read-only memory (CD-ROM)), or distributed through an application store (for example, Play Store™) or directly or online between two user devices (for example, download or upload). In the case of online distribution, at least a part of the computer program product may be temporarily stored or temporarily generated in the machine-readable storage medium such as a server of a manufacturer, a server of an application store, or a memory of a relay server.

Furthermore, in the specification, the term "unit" may be a hardware component such as a processor or circuit and/or a software component that is executed by a hardware component such as a processor.

The scope of the present disclosure is defined by the appended claims rather than the detailed description, and all changes or modifications within the scope of the appended claims and their equivalents will be construed as being included in the scope of the present disclosure.

What is claimed is:

1. An operation method of a first terminal, the operation method comprising:
receiving a first like signal, regarding a first user of the first terminal, transmitted from a second terminal to a server;
transmitting a second like signal regarding a second user of the second terminal to the server;
receiving a signal for establishing a call connection between the first terminal and the second terminal from the server;
performing a preliminary call with the second terminal based on the signal, wherein, while the preliminary call is in progress, an image of the second user of the second terminal is shown on a display of the first terminal; and
after the preliminary call is terminated:
outputting a message window on the first terminal, wherein the message window requests a primary response to the preliminary call;
transmitting the primary response to the server; and
determining whether to proceed with performing a main call, wherein the main call is based at least in part on:
the primary response to the preliminary call; and
a secondary response transmitted from the second terminal to the server.

2. The operation method of claim 1, wherein:
the second like signal is transmitted after the first like signal is received; and
the signal is for automatically making the preliminary call from the first terminal to the second terminal.

3. The operation method of claim 2, wherein:
the performing of the preliminary call is based on a preliminary response transmitted from the second terminal to the server, and
the preliminary response corresponds to acceptance or rejection of the preliminary call automatically transmitted from the first terminal.

4. The operation method of claim 1, wherein the preliminary call corresponds to a voice call and the main call corresponds to a video call.

5. The operation method of claim 1, wherein:
the first like signal is based on profile information about the first user of the first terminal; and
the second like signal is based on profile information about the second user of the second terminal.

6. A non-transitory computer-readable recording medium having recorded thereon a program for executing, on a computer, the operation method of claim 1.

7. A first terminal comprising:
a communication unit configured to:
receive a first like signal transmitted from a second terminal to a server;
transmit a second like signal regarding a second user of the second terminal to the server; and
receive a signal for establishing a call connection between the first terminal and the second terminal; and
a control unit configured to:
perform a preliminary call with the second terminal based on the signal, wherein, during the preliminary call, a camera of the first terminal is activated in order to capture video of the second user of the second terminal; and
after the preliminary call is terminated:
output a message window on the first terminal, wherein the message window requests a primary response to the preliminary call;
transmit the primary response to the server; and
determine whether to proceed with performing a main call, wherein the main call is based at least in part on:
the primary response to the preliminary call; and
a secondary response transmitted from the second terminal to the server.

8. The first terminal of claim 7, wherein:
the second like signal is transmitted after the first like signal is received; and
the signal is for automatically making a call from the first terminal to the second terminal.

9. The first terminal of claim 8, wherein:
the control unit is configured to perform the preliminary call based on a preliminary response transmitted from the second terminal to the server; and
the preliminary response corresponds to acceptance or rejection of the preliminary call automatically transmitted from the first terminal.

10. The first terminal of claim 7, wherein the preliminary call corresponds to a voice call and the main call corresponds to a video call.

11. The first terminal of claim 7, wherein:
the first like signal is based on profile information about the first user of the first terminal; and
the second like signal is based on profile information about the second user of the second terminal.

12. An operation method of a server, the operation method comprising:
receiving, from a second terminal, a first like signal regarding a first user of a first terminal;
receiving, from the first terminal, a second like signal regarding a second user of the second terminal;
transmitting a signal for establishing a call connection between the first terminal and the second terminal to at least one of the first terminal and the second terminal;
relaying a preliminary call between the first terminal and the second terminal based on the signal;
receiving, during the preliminary call, an image of the second user of the second terminal; and
receiving, after the preliminary call is terminated:
a primary response to the preliminary call from the first terminal; and
a secondary response to the preliminary call from the second terminal; and
depending on the primary response and the secondary response, relaying a main call.

13. The operation method of claim 12, wherein:
the second like signal is transmitted after the first like signal is received; and
the signal is for automatically making a call from the first terminal to the second terminal.

14. The operation method of claim 1, further comprising:
when at least one of the primary response and the secondary response indicate a rejection of the main call, terminating the call connection; and
when both the primary response and the secondary response indicate acceptance of the main call, performing the main call with the second terminal.

15. The first terminal of claim 7, wherein the control unit is further configured to:
when at least one of the primary response and the secondary response indicate a rejection of the main call, terminate the call connection; and when both the primary response and the secondary response indicate acceptance of the main call, perform the main call with the second terminal.

16. The operation method of claim 12, further comprising:
when at least one of the primary response and the secondary response indicate a rejection of the main call, transmitting a second signal for terminating the call connection to at least one of the first terminal and the second terminal; and
when both the primary response and the secondary response indicate acceptance of the main call, relaying the main call between the first terminal and the second terminal.

17. The operation method of claim 13, wherein:
the performing of the preliminary call is based on a preliminary response transmitted from the second terminal to the server, and
the preliminary response corresponds to acceptance or rejection of the preliminary call automatically transmitted from the first terminal.

18. The operation method of claim 12, wherein the preliminary call corresponds to a voice call and the main call corresponds to a video call.

19. The operation method of claim 12, wherein:
the first like signal is based on profile information about the first user of the first terminal; and
the second like signal is based on profile information about the second user of the second terminal.

20. The operation method of claim 1, wherein the preliminary call is terminated when a preset duration lapses.

* * * * *